UNITED STATES PATENT OFFICE.

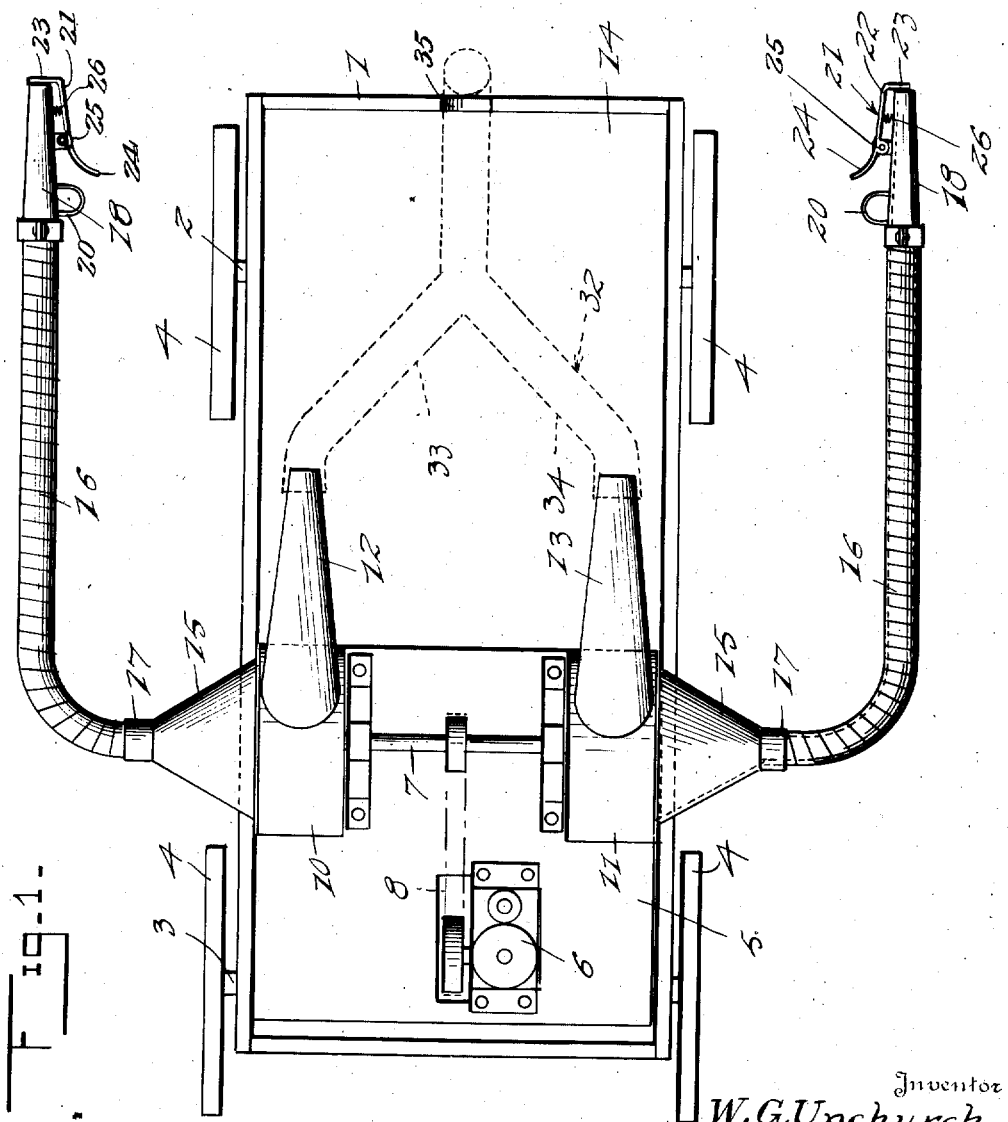

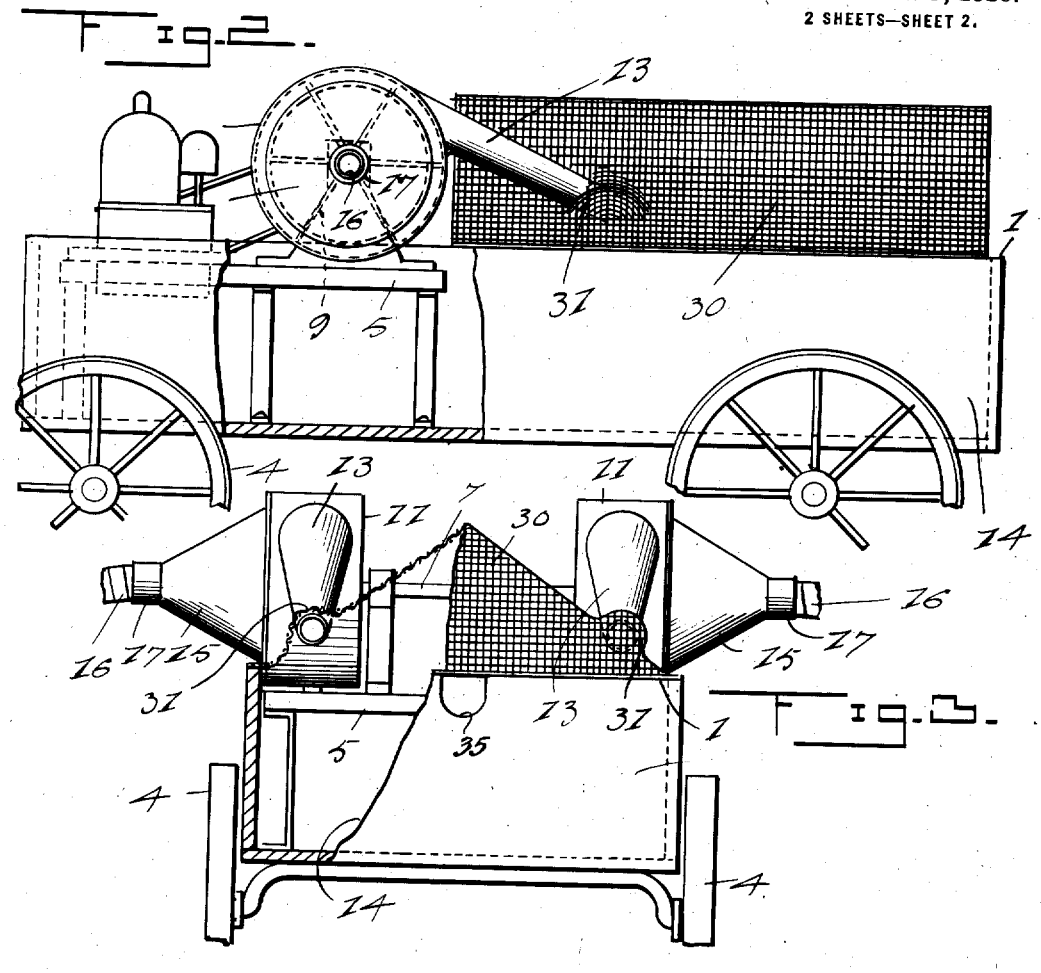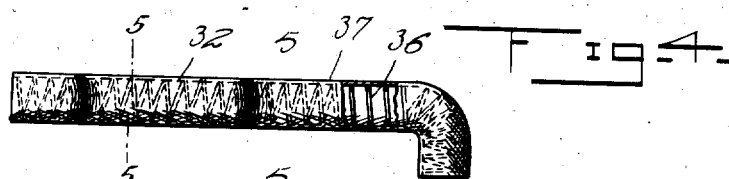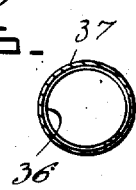

WALTER GEE UPCHURCH, OF NASHVILLE, TENNESSEE.

COTTON-PICKER.

1,258,277.	Specification of Letters Patent.	Patented Mar. 5, 1918.

Application filed March 25, 1916. Serial No. 86,683.

*To all whom it may concern:*

Be it known that I, WALTER G. UPCHURCH, a citizen of the United States, residing at Nashville, in the county of Davidson and State of Tennessee, have invented certain new and useful Improvements in Cotton-Pickers; and I do hereby declare the following to be a full, clear, and exact description of the invention, such as will enable others skilled in the art to which it appertains to make and use the same.

This invention relates to cotton pickers, and the primary object of the invention is to provide a cotton picker wherein air suction generated by a rotary fan is employed for picking the cotton and depositing it into a bed carried by the cotton picker.

A further object of this invention is to provide a cotton picker structure wherein the cotton is sucked inwardly through nozzles and a flexible member into the fan casing and forced outwardly therefrom into a retaining bed, and to provide a mesh work covering for the bed for preventing the cotton from being blown out of the bed.

A further object of this invention is to provide a novel form of nozzle structure for attachment to the outlets of the fans whereby the suction hose may be positioned within the retaining bed of the picker for unloading the cotton therefrom through the fans and outwardly through the normal form of nozzle structure.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a plan view of the improved cotton picker.

Fig. 2 is a side elevation showing parts thereof broken away.

Fig. 3 is a rear elevation showing parts broken away.

Fig. 4 is a detail view of the novel nozzle structure, and

Fig. 5 is a section on the line 5—5 of Fig. 4.

Referring more particularly to the drawings, 1 designates the supporting structure of the cotton picker which is mounted upon suitable axles 2 and 3, upon which axles are mounted the ordinary type of supporting wheels 4. The supporting structure 1 has a platform 5 carried thereby, upon which a prime mover 6 is mounted. The prime mover 6 may be any suitable type of internal combustion engine. The prime mover 6 is operatively connected to a shaft 7, through the medium of power transmitting means illustrated at 8. The shaft 7 is provided for rotating a pair of suction fans 9, which are positioned interiorly of casing 10 and 11. The fan casing 10 and 11 are supported in any suitable manner by the platform 5, and they have spouts 12 and 13 communicating with their outlet openings respectively. The spouts 12 and 13 have their delivery ends positioned for delivering cotton into a retaining bed 14.

Attached to the outer sides of the fan casings 10 and 11 are substantially conical-shaped hollow extensions 15, which extensions have flexible conduits 16 connected to their apexed ends as shown at 17. The flexible conduits 16 have nozzles 18 mounted upon their outer ends. The nozzles 18 are detachably mounted upon the outer ends of the flexible conduits or hose 16 in any suitable manner, and they have handles 20 formed thereon. A closure structure 21 is provided which includes a pivotally mounted member 22 having a closure plate 23 formed upon one end of the same which is adapted for closing the mouths of the nozzles 18 and preventing the inlet of cotton into the nozzle. The end of the lever 22 opposite to the end 23 is shaped to form a thumb rest as indicated at 24, so that the person carrying the nozzle 18 may by some pressure move the lever 22 upon its pivotal support 25, for moving the closure plate 23 out of alinement with the mouth of the nozzle. A spiral spring 26 is connected to the lever 22 and normally holds the closure end 23 in a nozzle closing position.

A foraminous cover 30 is provided for the retaining bed 14, which cover is substantially pyramidal shaped. The spouts 12 and 13 extend through the cover 30 as is shown at 31.

In picking cotton, the prime mover 6 is started which will operate the rotary suction fan 9, and create a suction through the flexible conduit 16 and the nozzles 18, so that when the closure plate 23 is moved from in front of the mouths of the nozzles, the operator may guide the nozzle for sucking the raw cotton from the bolls, which cotton will pass upwardly through the conduit 16 into the fan casings 10 and 11, and out of these casings through the spouts 12 and 13 into the retaining beds 14.

When it is desired to empty the bed 14 of its contents, nozzles 18 are removed from the ends of the flexible conduits 16, and these conduits are positioned so that their free inlet ends will be within the bed and the auxiliary nozzle structure illustrated at 32, has the ends of its branches 33 and 34 mounted over the delivery ends of the spouts 12 and 13 as indicated in dotted lines in Fig. 1 of the drawings. The cotton is then sucked by the operation of the fan through the conduits 16 into the fan casings forced outwardly through the nozzles 12 and 13 through the auxiliary nozzle structure 32 and discharged into a gin or any other suitable structure. The rear end of the retaining bed 14 is provided with an opening 35 through which the nozzle 32 extends.

In Fig. 4 of the drawings, a side elevation of the nozzle structure 32 is shown, part of which is illustrated in section to show the structure of the nozzle. The auxiliary nozzle 32 is composed of an inner section 36 which is formed of coiled wire, and an outer section 37 of duck or canvas which surrounds the inner coil section 36.

In reducing the invention to practice, certain minor features of construction, combination and arrangement of parts may necessitate alterations to which the patentee is entitled provided such alerations are comprehended within the scope of what is claimed.

What is claimed is:—

In a cotton picker structure, the combination, of a cotton receiving chamber, means for removing cotton from said chamber including a pair of air suction fans having outlet pipes, flexible members communicating with inlets of said fans, a forked nozzle, the arms of said nozzle connected to said outlet pipes, said flexible members extending into said chamber whereby the cotton will be drawn therethrough into said fans and out through said forked nozzle upon operation of the fans.

In testimony whereof I affix my signature in presence of two witnesses.

WALTER GEE UPCHURCH.

Witnesses:
R. A. MOORE,
H. R. PRICE.